April 1, 1952          R. D. WELLS          2,590,908

BLOCK MOLDING MACHINE

Filed Nov. 4, 1946          9 Sheets-Sheet 1

INVENTOR.
ROBERT D. WELLS
BY
Reynolds Beach
ATTORNEYS

April 1, 1952 — R. D. WELLS — 2,590,908
BLOCK MOLDING MACHINE
Filed Nov. 4, 1946 — 9 Sheets-Sheet 2
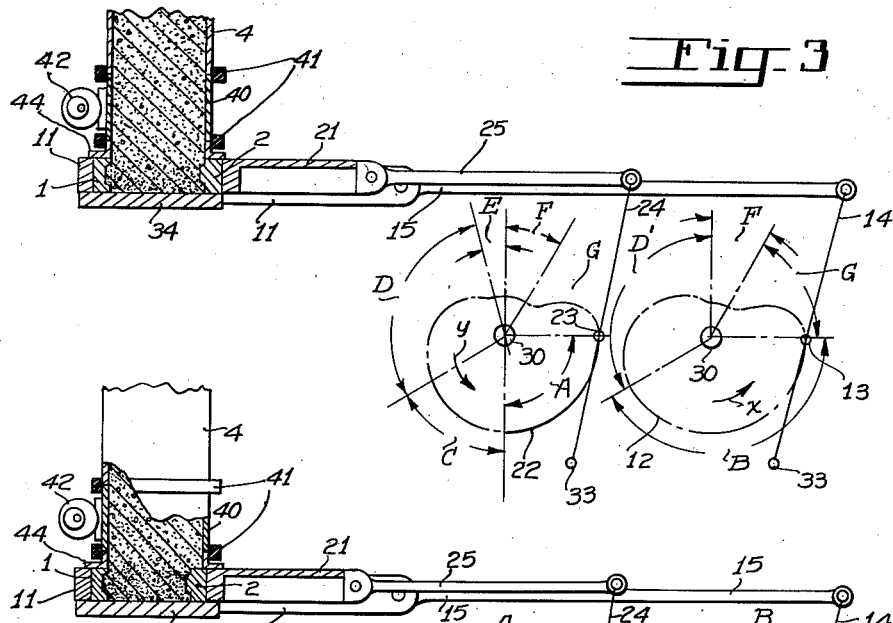
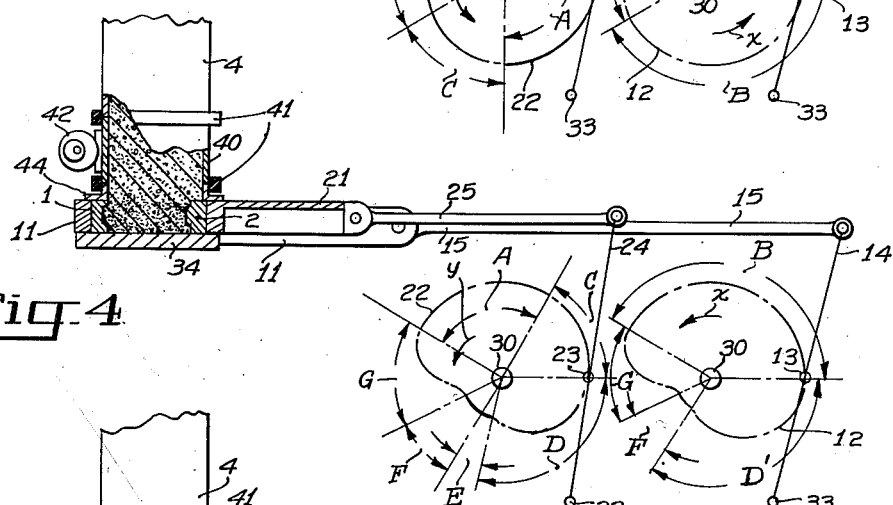
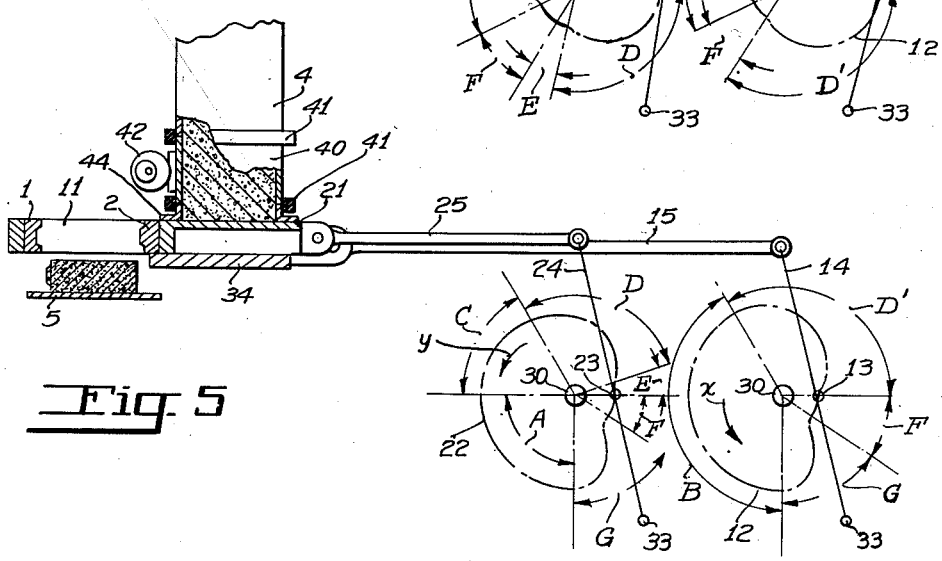
INVENTOR.
ROBERT D. WELLS
BY Reynolds N Beach
ATTORNEYS April 1, 1952   R. D. WELLS   2,590,908
BLOCK MOLDING MACHINE
Filed Nov. 4, 1946   9 Sheets-Sheet 3

INVENTOR.
ROBERT D. WELLS
BY Reynolds & Beach
ATTORNEYS

INVENTOR
ROBERT D. WELLS
BY Reynolds+Beach
ATTORNEYS

April 1, 1952 — R. D. WELLS — 2,590,908
BLOCK MOLDING MACHINE
Filed Nov. 4, 1946 — 9 Sheets-Sheet 5

Inventor
ROBERT D. WELLS
By Reynolds & Beach
Attorneys

April 1, 1952  R. D. WELLS  2,590,908
BLOCK MOLDING MACHINE
Filed Nov. 4, 1946  9 Sheets-Sheet 6
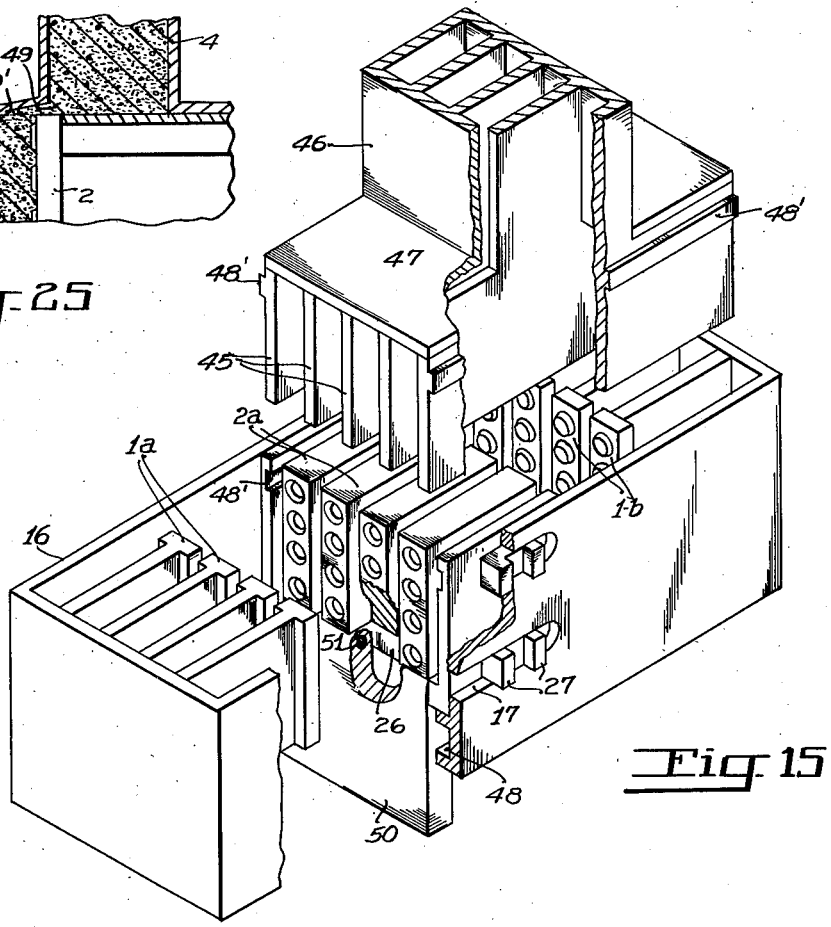
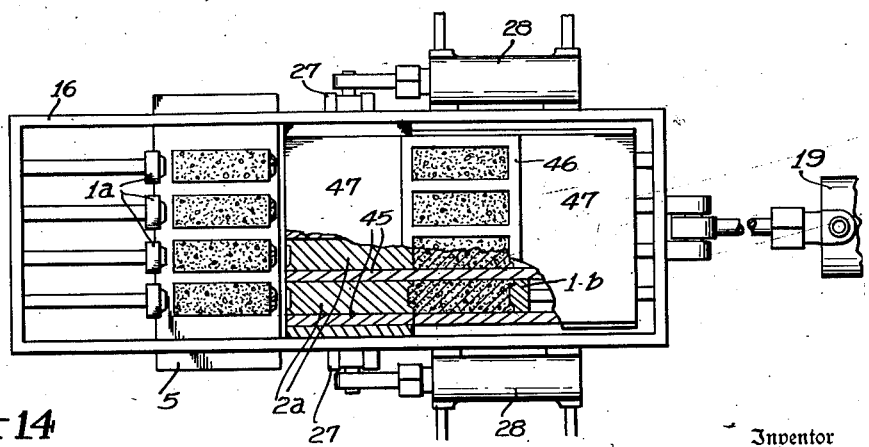
Inventor
ROBERT D. WELLS
By Reynolds+Beach
Attorneys April 1, 1952  R. D. WELLS  2,590,908
BLOCK MOLDING MACHINE
Filed Nov. 4, 1946  9 Sheets-Sheet 7

Inventor
ROBERT D. WELLS
By Reynolds + Beach
Attorneys

April 1, 1952 R. D. WELLS 2,590,908
BLOCK MOLDING MACHINE
Filed Nov. 4, 1946 9 Sheets-Sheet 8

Inventor
ROBERT D. WELLS
By Reynolds & Beach
Attorneys

Inventor
ROBERT D. WELLS
By Reynolds Beach
Attorneys

Patented Apr. 1, 1952

2,590,908

UNITED STATES PATENT OFFICE 2,590,908

BLOCK MOLDING MACHINE

Robert D. Wells, Seattle, Wash., assignor to The Wells Company, Inc., Kirkland, Wash., a corporation of Washington Application November 4, 1946, Serial No. 707,635

4 Claims. (Cl. 25—56)

The manufacture of concrete blocks of the type shown in the Wells Patent No. 2,371,201, issued March 13, 1945, wherein upstanding lugs match with and enter bottom sockets in the course above (or the reverse, if the blocks are laid with the sockets uppermost), is essentially a compression molding operation. The primary object of the present invention, therefore, is to provide a machine whereby blocks of this general type may be molded quickly, accurately, cheaply and conveniently, and by a machine which is simple and rugged and little likely to break down, but capable of extended periods of continuous operation.

The concrete mix used in molding such blocks is a very dry mix, so much so that the aggregates appear to be merely quite damp. The use of such a dry mix entails a number of problems, among them how to compact the mass within the mold, the tendency of the mix to bridge and obstruct narrow throats or passages through which it must fall or pass, its tendency to disintegrate if unduly disturbed, after the molding is complete, the difficulty of troweling the surfaces of the block to smooth them, and the desirability of incorporating within the block just the correct volume of compacted material, no more and no less. While solutions of individual problems may be simple, often the solution of one problem aggravates a companion problem, or makes impossible its solution. For instance, while jogging may compact the mass within a mold space, or awaiting delivery to such a mold space, if such jogging tends to disintegrate a previously compressed block not yet discharged from a companion mold space, or if the compaction by jogging is nullified by the difficulty of passing the material so compacted without appreciable disintegration through a restricted delivery opening, a problem of coordination arises from the interrelation of such operations. It is necessary, therefore, that the several individual problems be so solved in a manner which will not complicate the coordinate problems involved.

More particularly it is the object of the present invention to provide such a machine in which a shiftable mold box is employed, shiftable between a charge-receiving position and a discharging or releasing position, in which reduction of voids, as by compaction or compression, and final shaping, is effected intermediate charge-receiving and block-releasing operations, and wherein the shifting of the mold box is preferably through a minimum distance, to simplify the machine and to speed up its time cycle, hence to increase its output.

The operations necessary to produce such blocks by the general process already indicated can be performed by machines of varied form, and by certain variations in the specific steps or in their sequence. In particular, the density of the product can be increased, in various stages in its production, by any one or by any combination of several steps, namely, by static pressure, by dynamic pressure, or by vibrational or jolting compaction, provided this its done without interfering with other operations. One further object is to provide a machine and a process adaptable by design to the use of such steps, or of such combination thereof as may be desired, or preferred, or most suited to the result desired.

More specifically, in connection with the latter object, it is an object, in one form of the machine, to effect precompression of the material by static pressure and/or vibrational compaction within the chute by which it is conveyed to the mold box, to hasten its entrance into the mold box, as by jolting such as also effects compaction, or by expansion of the chute walls to permit the compacted material to drop freely and without disturbance, and to effect further compression of the charge by the dynamic pressure of contracting mold box parts, whether against the reaction of rigid mold box walls, as in one arrangement, or against the reaction of the static pressure upon material within the chute, as in another arrangement.

One of the problems being to incorporate in each block just the correct volume of material, properly compacted, but no more nor no less, it is an object of this invention to provide a mechanism whereby adequate compaction is assured by compacting the material within the block-containing mold while it still constitutes part of a larger mass or column similarly compacted, and then segregating the material which is to constitute the block from the larger mass in such manner that any deficiencies in the block arising during segregation are supplied immediately from the larger mass, and likewise any surplus in the block is extruded to join the larger mass, to the final end that the segregated block shall be full and complete, but not of excessive volume, of regular size and shape and fully and evenly compacted throughout.

It is also an object to provide a block-molding machine of the general nature indicated, the principles whereof may be incorporated in a machine to produce single blocks or a plurality of blocks, as the designer may choose, at each operation.

A further object, in at least certain forms of the machine, is to provide a structure whereby such machine, by insertion or removal of filler blocks, may make different sizes of concrete block, as required.

The essentials of the invention will be understood from the above, but it will be better understood, and further objects will appear, from a study of the following specification, taken in conjunction with the accompanying drawings, and the scope of the invention will be defined by the appended claims.

The drawings are not to be understood as representing a production machine or machines. Rather, they are wholly, or largely, diagrammatic in nature, to the end that the principle of operation of each form of the machine may be made clear, without distraction from the understanding of such principle by inclusion of a mass of mechanism unnecessary to that understanding, and capable of being supplied as a matter of routine by a skilled machine designer.

Figures 3, 4 and 5 are diagrammatic views illustrating successively the cycle of operations, according to the intended plan.

Figure 9:
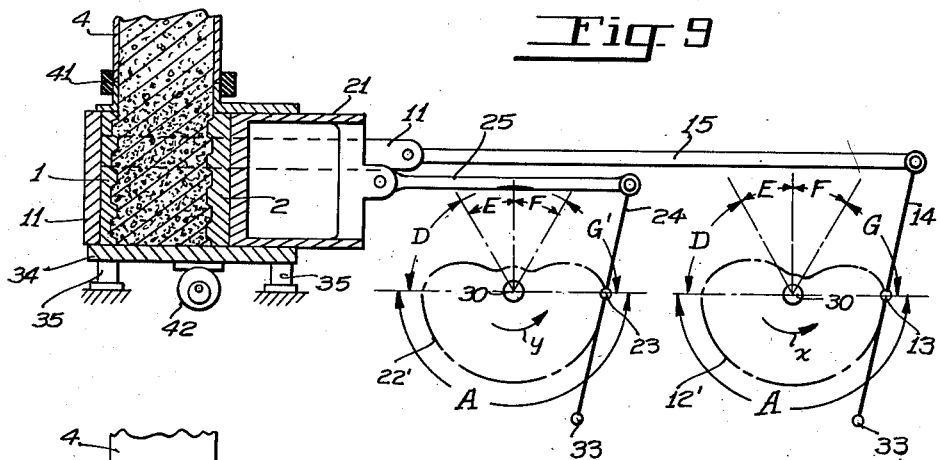
Figure 10:
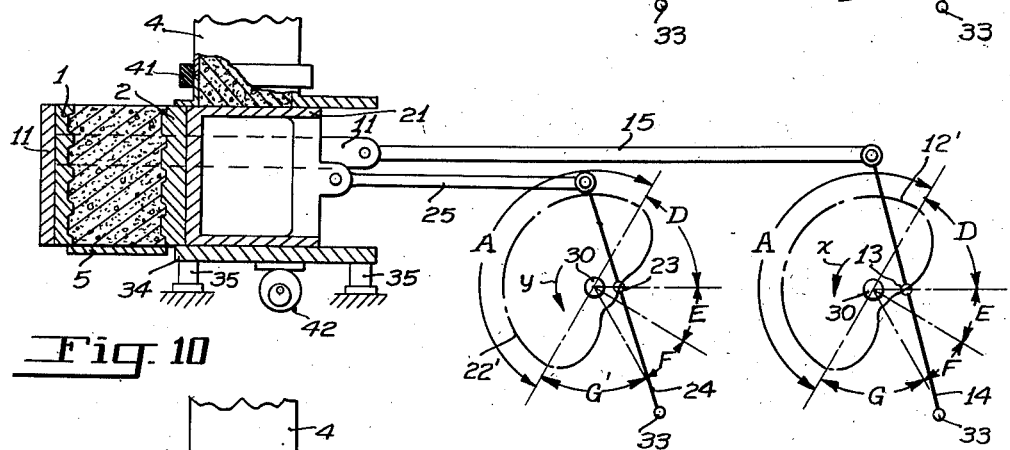
Figure 11:
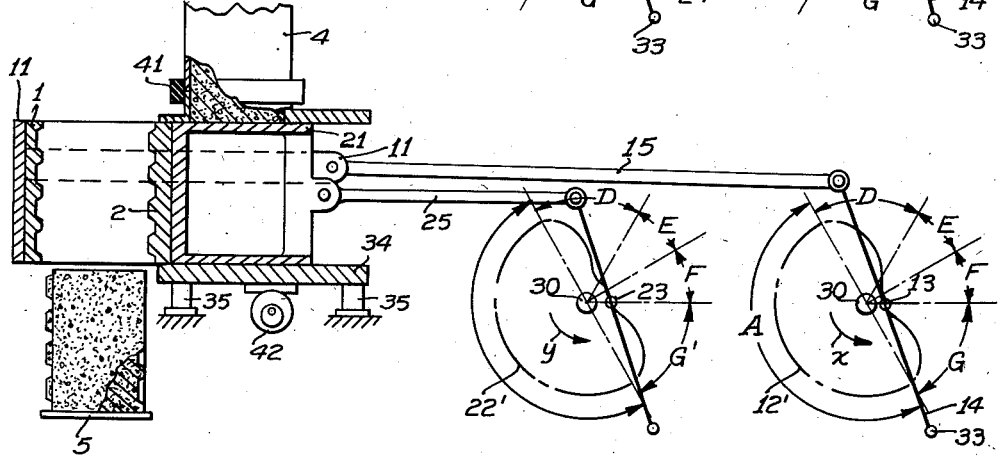

Figures 9, 10, and 11 are sequence diagrams of a machine constructed and operated similarly to (though somewhat differently from) the machine of Figures 3, 4, and 5, but arranged for simultaneous molding of concrete blocks in multiples.

Figure 12:
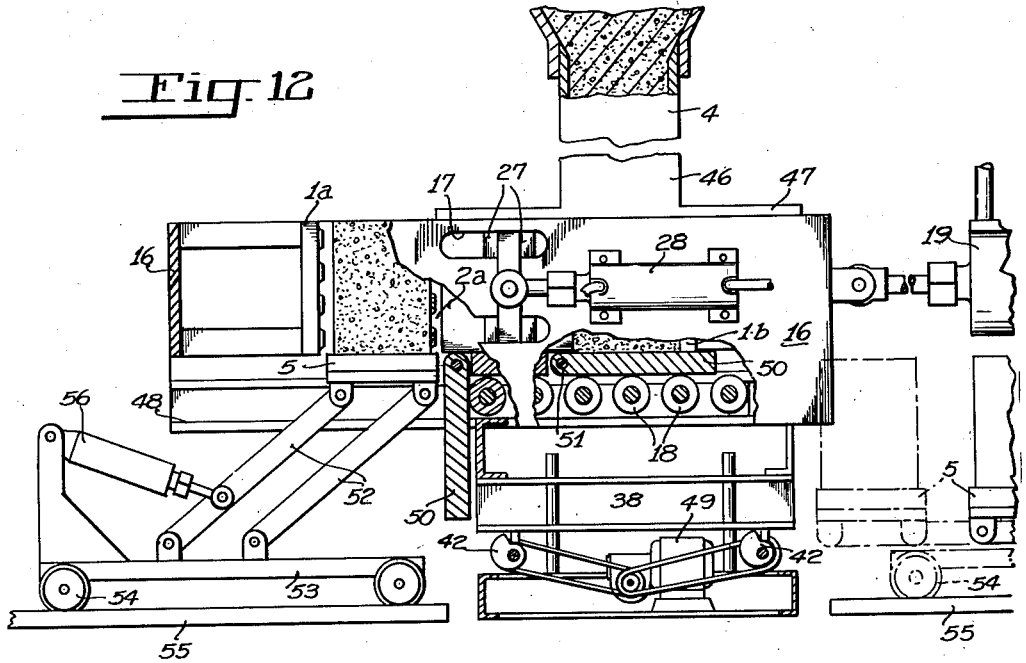
Figure 13:
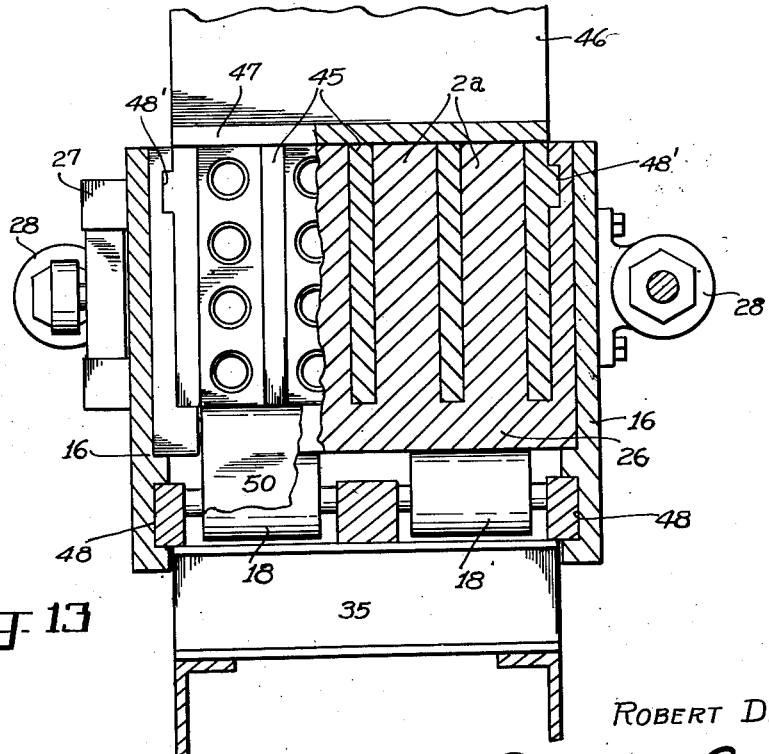

Figure 12 is a side elevation, broken away, Figure 13 is a vertical transverse section, Figure 14 is a plan view, broken away, and Figure 15 is an exploded isometric view, all illustrating a practicable form of double-ended machine for the manufacture of blocks in multiple.

Figure 16:
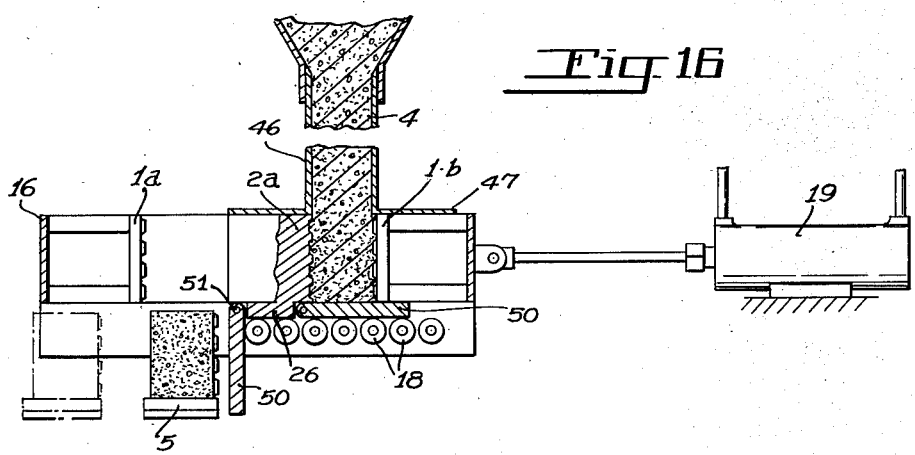
Figure 17:
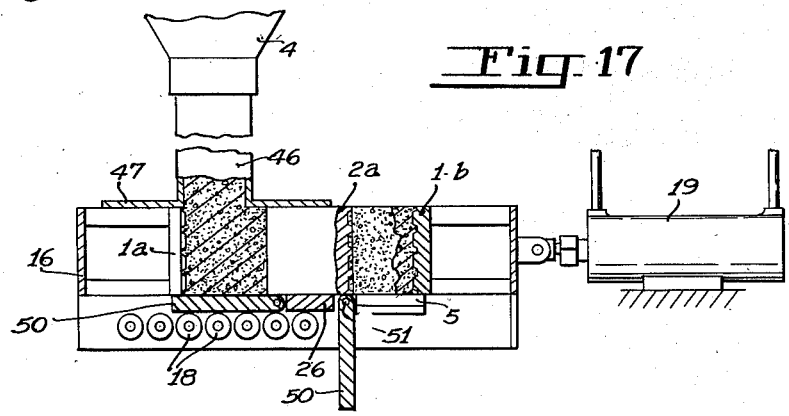
Figure 18:
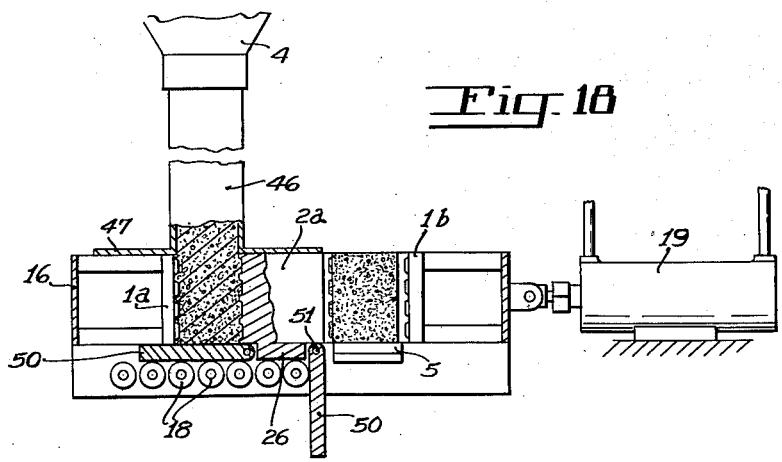

Figures 16, 17, and 18 are successive sequence diagrams of the block-molding operation in the machine of Figures 12 to 15 inclusive.

Figure 19:
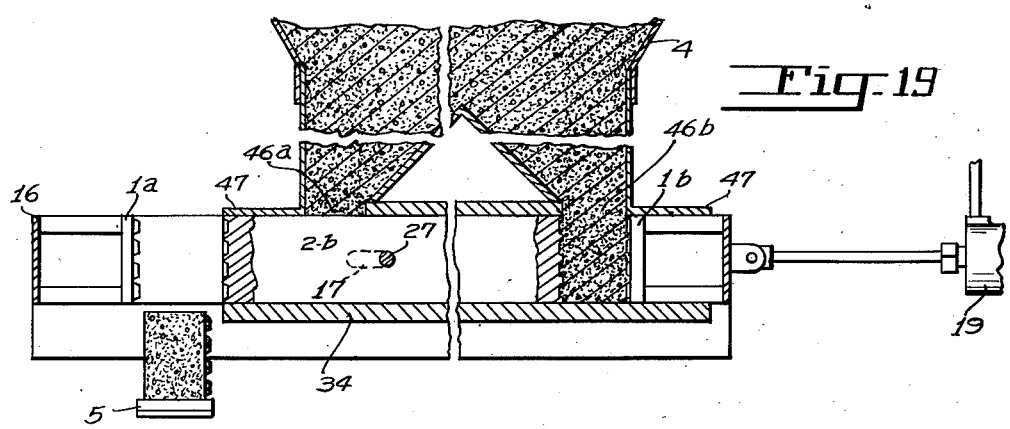
Figure 20:
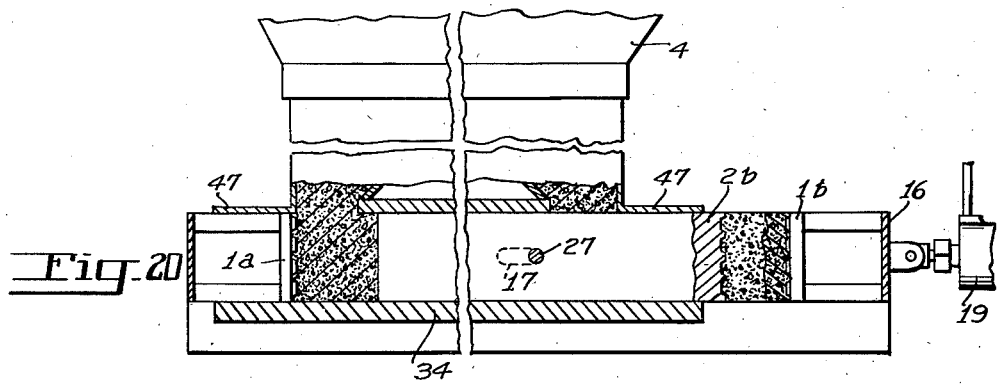
Figure 21:
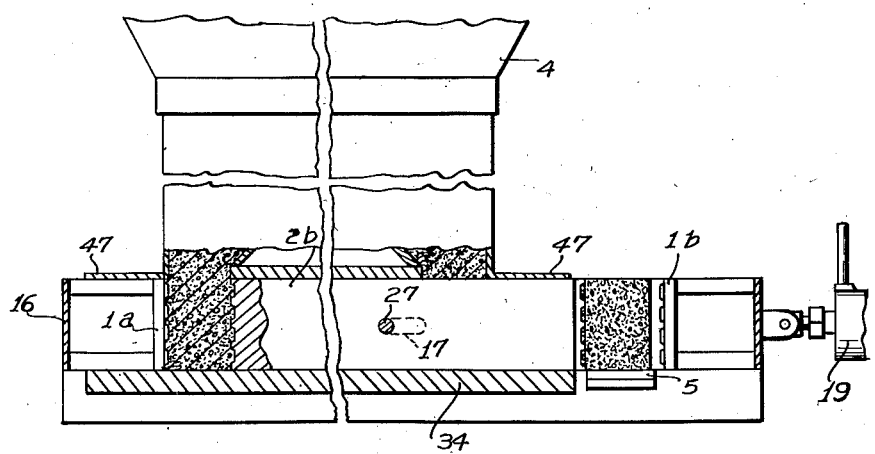

Figures 19, 20, and 21 are diagrammatic views similar to Figures 16, 17, and 18, but illustrate a modified form of machine, operating according to a slightly different process.

Figure 22:
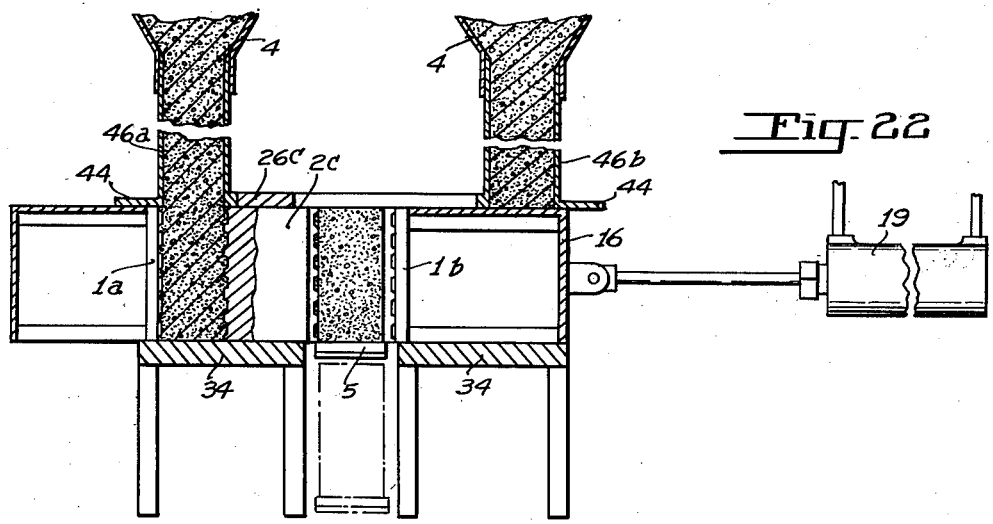
Figure 23:
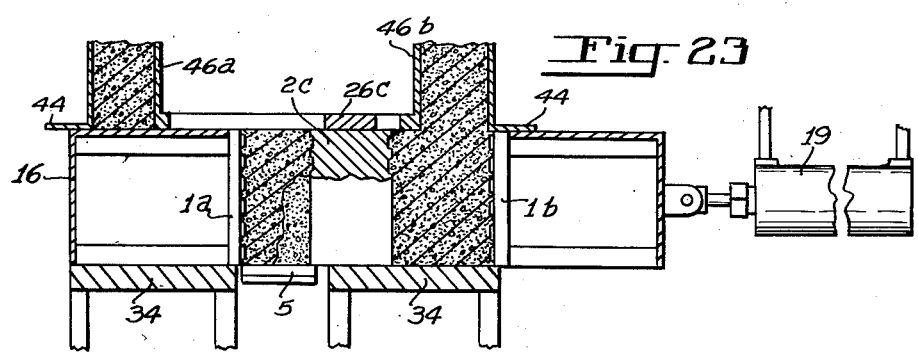
Figure 24:
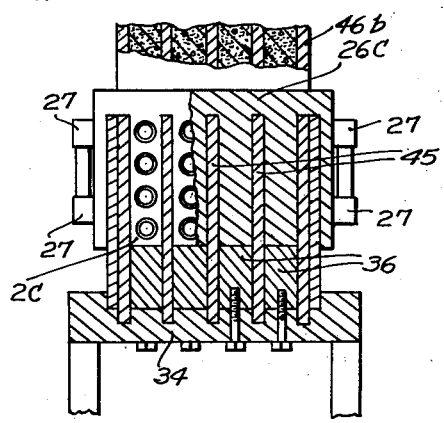

Figures 22 and 23 are sequence diagrams of a further modified form of the machine, and Figure 24 is a transverse vertical section therethrough.

Figure 25 is a sectional view of a detail of construction which may be common to all forms of the machine.

Figure 26:
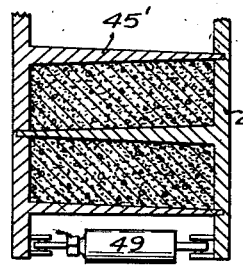
Figure 27:
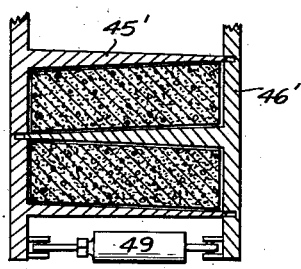

Figures 26 and 27 are sequential cross-sectional diagrams through the charge box, in a modified form.

Before proceeding to describe the machine or process, it will be helpful to reiterate that such concrete blocks are molded from a very dry mix, containing only sufficient moisture for proper hydration of the cement. The mixture handles, then, more like moist sand than like a liquid. It does not pour nor drop through a restricted opening with freedom, but must be urged therethrough. The voids in the mix must be reduced, to give the block proper body and strength, yet the effect of any compaction thereof is lost if in passing through an opening the mass is disintegrated. Its volume should be complete, but there should be no excess of material. Its surfaces should be smoothed, by troweling or by compression. Such considerations, i. e., the necessity for urging or passing it through a chute and into a mold, and the necessity for reducing the voids, indicate the desirability of using any one, or more, or all, of such methods as vibration and jogging, and dynamic compression or squeezing, and the inherent nature of the mix suggests the possibility of using static compression, or resistance to expansion, whether by weight of material from above, or by an applied weight or air pressure, in the compaction or compression ( grouped under the term "compression" as hereinafter used in this specification, including the claims) and in the feeding of the mix. While such compression methods are in themselves old in handling such materials, the manner of their use, and their relationship to other steps in the method as a whole, as herein used, are considered to be part of the present invention.

Figure 1:
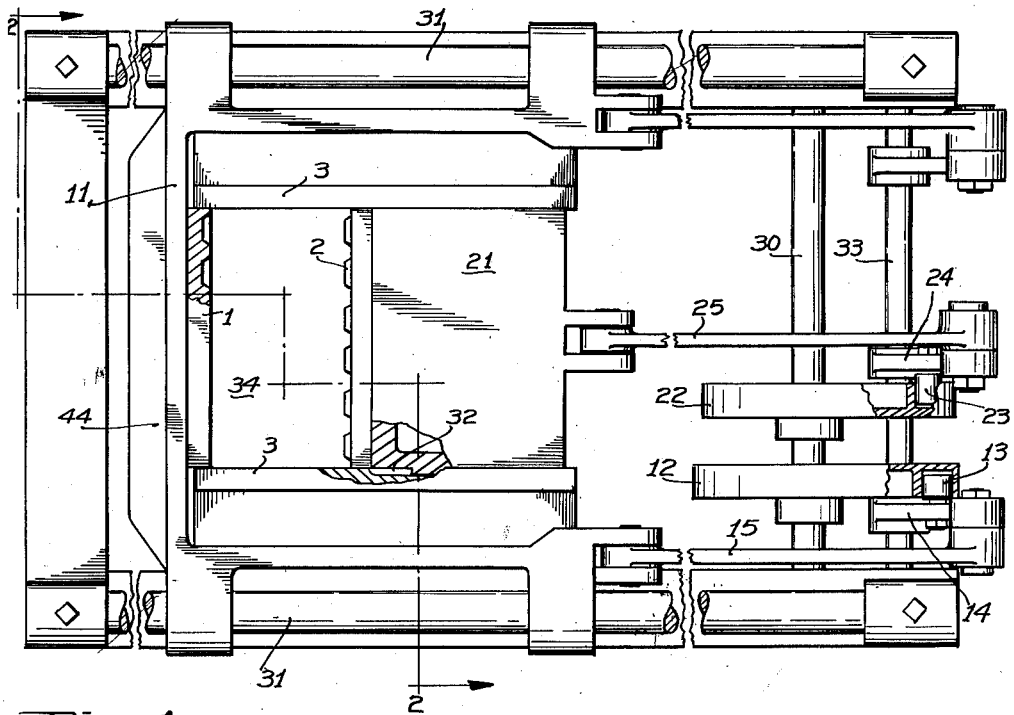
Figure 1 is a plan view, with parts broken away, of an elemental form of the machine.
Figure 2:
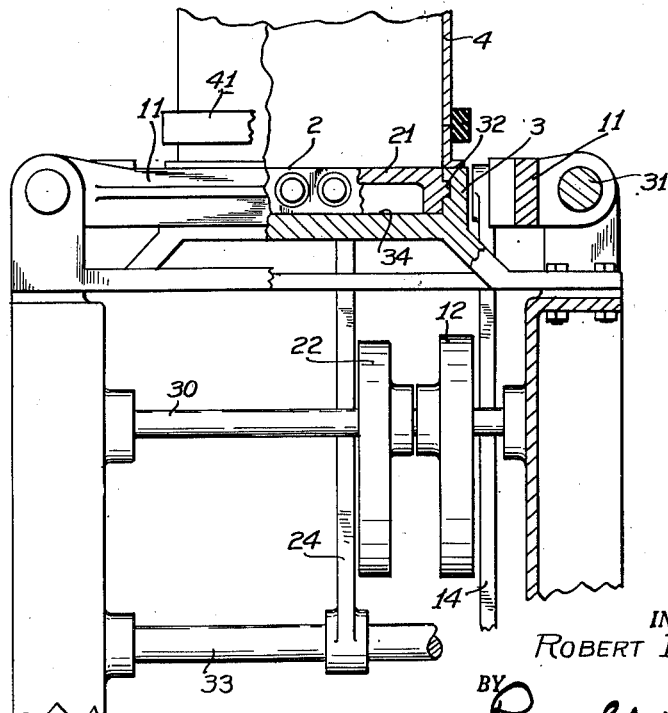
Figure 2 is a part-elevational and part-sectional view of the same, taken along the line 2—2 of Figure 1.

While the principles of the invention may be incorporated in machines of rather widely varying construction, it is believed these principles can best be understood by reference to a machine which will make one block at a time, and which employs three compressional operations. Such a machine is illustrated in some detail in Figures 1 and 2, and in diagrammatic fashion in the sequence diagrams, Figures 3, 4, and 5.

The mold box of the machine incorporates a front die plate 1, a rear die plate 2, and end plates 3. The die plates 1 and 2 are movable conjointly and also relatively. The end plates 3 preferably are part of the fixed frame, as shown, or they may be movable with one or the other of the die plates 1 or 2. The mold box is open at the top and bottom. In the arrangement shown the front die plate 1 is carried upon a yoke 11 slidably guided upon the fixed rods 31, and the rear die plate 2 is carried upon a separate yoke or plate 21, guided at 32 in the end plates 3, outside the confines of the mold box.

Synchronized shifting of the mold box and of its parts relative to one another is accomplished by the respective cams 12 and 22 upon the rotative shaft 30; the cam 12 controls movement of the die plate 1, and the cam 22 controls the die plate 2. Cam followers 13 and 33 engage in the grooves of the respective cams 12 and 22, these followers being carried upon the respective rocker arms 14 and 24 upon the rock shaft 33, and the rocker arms are connected by the respective links 15 and 25 to the yokes 11 and 21, respectively. The form and synchronization of the cams will be described more particularly in connection with the description of the diagrammatic views, Figures 3, 4, and 5.

A fixedly positioned chute 4 is disposed so that in one position of the shiftable mold box the latter registers with the bottom of the chute. The chute is shown as of rather appreciable height, so that a column of some depth of concrete mix, such as has been described, is supported therein. Normally some three feet or more of height is maintained, with the result that this column of mix tends to become statically compressed at the bottom of the chute 4, just prior its discharge into the mold box. Mere pressure of the mass above can thus serve statically to compress the material at the chute's outlet, and instead of the mass' pressure an actual weight might be employed resting upon a shorter column of material, or fluid pressure may be impressed upon the material within the chute. Incidentally, the term "chute" does not imply a closely confined column above an aperture, for in some forms of the machine (see Figures 19, 20, and 21) the chutes may take the form of apertures only leading from a common hopper space.

Instead of static compression, dynamic means may be employed to effect compression. To that end a charge box or lower terminal section 40 of the chute may be vibrated continuously by a vibrator 42, or jogged during certain periods. This section 40 is vibrationally insulated from, yet held in alignment with, the remainder of the chute 4 by means typified by the resilient bands 41. Vibration of this section 40 not only compresses the material therein, but also maintains such material kinetically in motion, ready to drop rapidly into the mold box when the latter moves into registry with the chute. Jogging compresses the material therein, also, and acts to drop the compressed charge without material disintegration into the mold box. Such discharge of a precompressed charge (however precompressed) from the charge box into the mold box, without undue disintegration, is facilitated by separation of the charge box walls, in a manner suggested in Figures 26 and 27, and applicable to all forms of the machine.

In order to close the bottom of the mold box, when in charge-receiving position, a table 34 is provided at this location. Since the compressed block must be shifted beyond the edge of the table 34 to release it, and this is accomplished by shifting the mold box from its charge-receiving position laterally to a releasing position, means must be provided to prevent discharge of material from the chute 4 until the mold box has been returned to a charge-receiving position, or some other mold box has been shifted into such charge-receiving position. The plate 21, in addition to serving as a supporting yoke for the die plate 2, may serve as a closure plate for this purpose.

Movement of the mold box laterally segregates its charge, now at least partially compressed by vibration, jogging, and/or perhaps by some contraction of the mold box against resistance, from the supply in the chute. Such movement also trowels or smoothes the top surface, provided the top plate or flange 44 is wide enough, and correctly formed or presented to the top surface of the block, as relative movement occurs. Usually the desire that lengthy lateral travel of the mold box be avoided conflicts with the desire for adequate troweling at 44, and a compromise may be found desirable. Troweling, or its equivalent, smoothing, can be accomplished otherwise, however, and resort may be had to such other operations, compression or reshaping of the block within a confined space, to lessen the actual troweling movement of the block.

Reference to Figure 25 will illustrate how the flange 44 at the cut-off side of the bottom of the chute 4, in all forms, is intended to be chamfered off at 49, which tends to press into the outwardly moving mold box all possible material, up to the final point of cut-off, represented by the slight vertical wall 49'. The latter prevents such wedging as might tend to burst the mold box, and acts as a definite cut-off.

Lateral shifting of the mold box, containing precompressed material, from communication with the chute, also containing material which at its bottom is equally compressed, and the further compression of the material in the mold box before communication is interrupted between the mold box and the chute, serves to insure that the entire mold box is completely filled with uniformly compressed material, yet that there is no excess of material to create bulging or misshaping of the block, after relaxing of the pressure upon it. As cut-off occurs, any voids in the charge are supplied from the compressed material in the chute above, and if the mold box is too greatly filled, or if the charge is too greatly compressed, the excess is relieved before final cut-off, and passes upwardly into the chute above the mold box.

The preferred cycle of operation, illustrated in Figures 3, 4 and 5, is, briefly, to present the open mold box initially in communication or registry with the bottom of the chute, thereto receive from the chute a charge which has already been compressed partly, by one or more of the operations suggested above, and this operation is illustrated in Figure 3. While holding the die plate 1 stationary and advancing the die plate 2, or vice versa, the charge received within the mold box is compressed while in registry with the bottom of the chute, against the resistance of the column of material within the chute above the mold box; this operation is illustrated in Figure 4. The compressed block is then segregated from the material in the chute by simultaneous and equal advance of the die plates 1 and 2 to a position beyond the edge of the table 34, and by subsequent relative separation of the die plates 1 and 2 the block is delivered from within the mold box upon a pallet 5 or any other suitable means positioned to receive it; this operation preceded the operation illustrated in Figure 5. The latter figure shows the mold box still open, but not withdrawn, and the pallet-supported block moving downwardly, clearing the mold box so that the latter may be withdrawn to the right to its initial position.

Starting with the cams 12 and 22 in charge-receiving position, as they are shown in Figure 3, and rotating them in the direction indicated by the arrows $x$ and $y$, both the die plates 1 and 2 are caused to dwell or remain in their open charge-receiving position throughout some 90° of rotation, as indicated by the sector A in conjunction with the cam 22. Some appreciable time is consumed in urging a full charge into the mold box, even under the influence of vibrating and/or jogging. This time can be reduced by adopting the arrangement of Figures 26 and 27, hereinafter described in detail. The die 1, controlled by the cam 12, continues to dwell thereafter throughout the remainder of the sector B, but during the portion C which corresponds to the last part of the sector B and cam 22 causes compression and final shaping by effecting approach of the die plate 2 towards the still stationary die plate 1, as is shown in Figure 4. Thereafter, through so much of the sectors D both cams, the two die plates 1 and 2, relatively immovably held in their compressed positions, travel conjointly and equally to the left to segregate the compressed block from the material within the chute, and to carry the compressed block outwardly beyond the edge of the table 34, troweling its side edges, top and bottom by movement relative to fixed mold box walls. Once the compressed block is clear of the table 34, the pallet 5 being then located in coplanar extension of the table 34, sector E of the cam 22 reverses slightly the travel of the die plate 2, while the die plate 1 continues its advance through the final portion of the sector D', this relative movement of the die plates 1 and 2 acting to separate them for release of the blocks, to rest upon the pallet 5. Through the sectors F the cams 12 and 22 cause the die plates 1 and 2 to remain at rest, in their open, leftward positions, this dwell of the two die plates being necessary in order to afford time for the compressed block, upon the pallet 5, to move downwardly clear of the mold box. Thereafter, through the sectors G, both die plates are withdrawn to the right from the releasing position, still open, back to the initial charge-receiving position. They move in unison, and at the end of sectors G are back which they started from, as illustrated in Figure 3.

Figure 6:
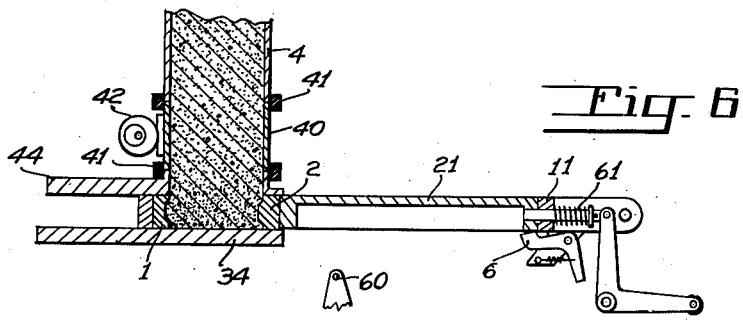
Figures 6, 7 and 8 are a similar succession of diagrammatic views illustrating a modified form of machine and plan of operation.
Figure 7:
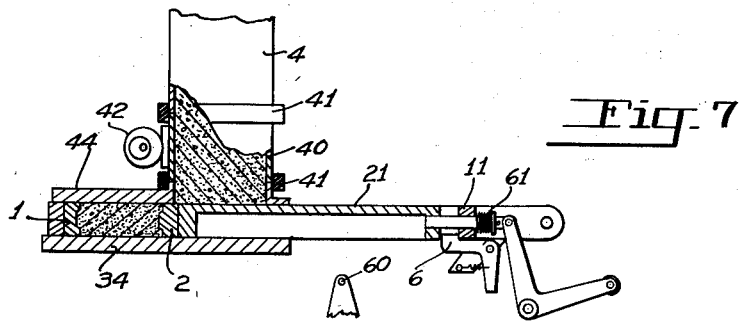
Figure 8:
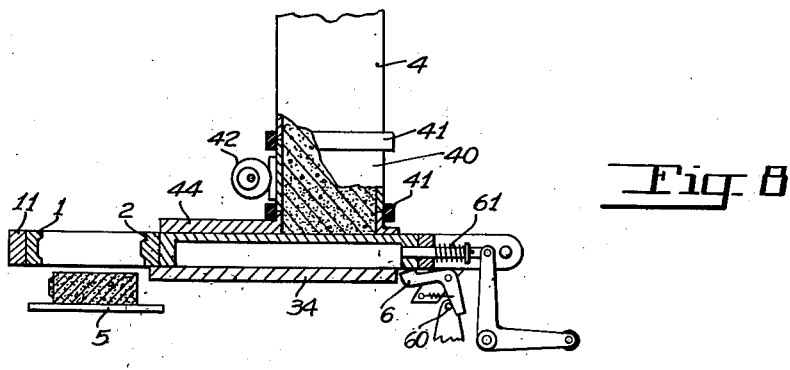

A somewhat different cycle of operation is illustrated in Figures 6, 7 and 8; here, briefly, the cycle is, first, to receive a charge, preliminarily compressed by static pressure or by vibration, or by jogging, any or all, within the open mold box from the bottom of the chute 4, as illustrated in Figure 6, but instead of further compressing the charge while in open communication with the chute, the modified arrangement contemplates advancing the mold box, without material approach of the front and rear die plates 1 and 2, to a position out of registry with the open bottom of the chute 4, but wherein the top, bottom, and sides of the mold box are still closed, and there to effect approach of the die plates 1 and 2 for final compression, while the charge is confined between the table 34 and the top plate 44, as shown in Figure 7. Some means may be provided to lock the die plates 1 and 2 in their compressed position, as for example, an intervening lockable dog 6 interposable between the yokes 11 and 21, and then by further advance of the dies, thus compressed, the charge is troweled on top and bottom, and the mold box is brought to a releasing position beyond the edge of the extended table 34. At that point a fixed stop 60 engages the dog 6 and releases the same, permitting the dies to be spread by the spring 61. Immediately the compressed block is released, to be received upon the now coplanar pallet 5. The cams for effecting such movement of the elements in Figures 6, 7 and 8 have not been shown, but since the cycle is readily understandable it is evident that the design of cams to effect such movements is a routine job for a machine designer, and that any cams or controls that are suitable may be employed.

Except for the better troweling accomplished in the machine just described, the arrangement of Figures 3, 4 and 5 is preferred to that of Figures 6, 7, and 8, primarily because of the short stroke of the machine parts, the greater simplicity and lesser weight of the cams and other mechanism, the greater certainty that each block will be full but not bulging, and because the time cycle of the machine can be less than that of Figures 6, 7 and 8, hence its output can be greater.

The arrangement shown in Figures 9, 10 and 11 is quite similar to the arrangement of Figures 3, 4 and 5. Differing from the latter, the machine of Figures 9, 10 and 11 is intended to mold several blocks in multiple, and while each rests upon one end, rather than a single block lying flat on one side face, also, differing from all the machines previously described, the machine of Figures 9, 10 and 11 does not squeeze or compress the blocks dynamically, but relies on compression and compaction achieved by the static pressure in the chute or by the vibrational compaction of the material within the mold, or by jogging.

In this form of the machine the die plates 1 and 2 are connected, as in the other forms, to the respective yokes 11 and 21, and may be controlled by the respective cams 12' and 22'. The cycle of operation is slightly different since there is no squeezing together of the plates 1 and 2, as will shortly be explained. The arrangement shown accomplishes vertical jogging of the mold, both for preliminary compression and for quick discharge into the mold box, although a different discharge-facilitating arrangement is preferred, as will appear later; the table 34, forming part of the mold box, is mounted upon rubber blocks 35 and is connected to the fixed chute by a flexible connection, such as the rubber collar 41, so that the mold box as a whole may be jogged, under the influence of the jogger 42 fixed to the bottom of the table 34. Such jogging would occur only while the mold box is in the closed position of Figure 9, and would cease prior to movement to the positions of Figures 10 and 11. Similar jogging arrangements may be incorporated in any of the other forms of the machine.

Starting with the mold box open, in charge-receiving position in registry with the bottom of the chute 4, as shown in Figure 9, rotation of the cams in the direction of the arrows $x$ and $y$ through the sector A permits the mold box to remain in this charge-receiving position while jogging occurs to urge the material from the chute into the mold box, and to compact it in the latter. The next step, through the sectors D, is to advance the two die plates 1 and 2 conjointly and without relative movement to the left, to sever the molded and compacted blocks from the material within the chute and to carry them outwardly beyond the edge of the table 34 into position where they will rest upon a pallet 5. The next operation, and one which follows so immediately in sequence as to be indistinguishable from the sector D in so far as the die plate 1 is concerned, is to continue the movement of the die plate 1 to the left, while halting and reversing to a slight extent the leftward movement of the die plate 2. This occurs through the sector E, and is the releasing operation. Next, since time must be afforded for the molded blocks to move downward and clear the mold box before the latter can be withdrawn, the sectors F are dwells, holding the mold box open and the die plates extended to the left. Once the molded blocks have cleared the mold box, as is seen in Figure 11, the sectors G and G' will cause the die plates to move to the left to return to their charge-receiving position of Figure 9. At the same time that they are moving to the left, they are also being moved toward one another, since previously they had been spread apart for discharge of the blocks.

To this extent the cams 12' and 22' are slightly different in their sectors G and G' respectively.

In the machines heretofore described a single chute has cooperated with a single mold box; whether that mold box be capable of molding single blocks or multiple blocks, it was still a single mold box. In consequence, while the mold box was in the discharging position, and while it was being held at that position pending the downward movement of the pallet and the discharged block to clear the mold, the bottom of the material chute was closed off and, of course, was not discharging. There is a certain waste of time which occurs thus, for the downward movement of material into the mold box requires an appreciable time, as much or more time than is required for compression within or travel of the mold. By a suitable arrangement, such as is about to be described, provision can be made for filling a second mold box while the first mold box is discharging its block or blocks, and vice versa. In this way the time required for the blocks to clear the one mold box is not wasted, for simultaneously the time-consuming step of charging the other mold box is taking place.

A simplified or diagrammatic design of the machine to this end is shown in Figures 16, 17, and 18, and a more practical construction is shown in somewhat greater detail in Figures 12 to 15, inclusive. The mold boxes are of the multiple type, and die plates 1a and 1b are supported projecting inwardly from the ends of a mold frame 16 which is open at the top and bottom. The die plates 1a and 1b are fixed relatively to each other by reason of the fact that both are fixed to the mold frame 16. The die plates 2a are common to, or alternatively cooperate with the die plates 1a and 1b, and are interposed between the latter, with some relative movement between the die plates 2a and the mold frame 16, guided at 48. Thus, for instance, the die plates 2a, supported from below by a common base plate 26, are guided in the sides of the frame 16 by means of pins 27 projecting through slots 17 in the mold frame 16. As a means of accomplishing such relative movement I have illustrated the cylinder 28 mounted upon the side of the frame 16, and having its plunger connected to the pins 27.

The individual blocks in the two mold boxes thus constituted are separated by partition plates 45 which depend from a vibratable charge box 46 constituting the lower terminus of the chute 4. Lateral extensions 47 constitute the top of each mold box at the respective sides of the charge box 46. The mold frame 16 has a guided sliding engagement at 48' with the partition assembly, relative to which the mold frame shifts laterally under control of jack 19. Antifriction rolls 18 carried by the fixed frame 35 serve to support certain parts of the mold frame 16, such as the base plate 26, and bottom covers 50, hinged to the frame 16 at 51.

The fixed support for this machine preferably has mounted upon it joggers 42, driven by a motor 49, whereby the entire mold may be vibrated or jogged to compact material within a mold box. In such double-ended molding machines jogging must not occur when one mold box is filled but is unsupported from below, and an alternative to jogging is shown in Figures 26 and 27, which will be described shortly.

Pallets 5 are mounted for vertical movement as in the other forms, and a convenient arrangement to this end consists of the parallel links 52 whereby the pallet is mounted upon a car 53, the supporting wheels 54 whereof ride upon the rails 55. Vertical movement of the pallet is controlled through the parallel links 52 by a jack 56. Any suitable means, not shown, are provided for affording movement of the car 53 along the rails 55.

In Figure 16 the right-hand mold box is shown filled and its opposite walls squeezed together. The left-hand mold box has been opened long enough that the pallet 5 has lowered the molded blocks upon it clear of the left-hand mold box. The position of parts as shown in Figure 16 is just prior to initiation of conjoint movement of the die plates 2a and 1b to the right. This dextral movement has just been completed in Figure 17, and as a result of its completion, the hinged bottom cover 50 at the right has dropped downwardly to leave the mold box open at its bottom, and to permit the pallet 5 to be lifted into contact with the bottom end of the blocks within the right-hand mold. The bottom cover 50 at the left has swung upwardly to close the left-hand mold box. The die plates 2a and 1b have not changed their positions relative to one another, so that the blocks in the right-hand mold box are still held compressed. On the other hand, the left-hand mold box is now in registry with the charge box 46, and has received a charge, and that charge has been or is being compressed therein. Jolting would cease during such time as either mold box is in the clear, and until the blocks have been released therefrom, although vibration of the chute terminus 46 need never cease.

As will be seen from Figure 17, the die plates 2a are to the right, to close the right-hand mold box to the minimum size, and to leave the left-hand mold box wide open for the reception of its charge. The next step in the process, however, is to squeeze the charge now received within the left-hand mold box, and at the same time to open the right-hand mold box for discharge of the blocks from the latter. Both these operations are accomplished simultaneously by moving the die plates 2a, under the influence of the cylinders 28, to the left, and the mold frame 16 and die plates 1a and 1b to the right, relative to one another. This position of the parts is shown in Figure 18. There ensues the downward movement of the blocks on the pallet 5, during which jolting is resumed to fill and to compact material within the left hand mold box, and as soon as the blocks have cleared the right-hand mold box, the die plates 1a and 2a move conjointly and without relative movement to the left and then separate, for discharge of the blocks compressed in the left-hand mold box, whereupon parts will be substantially in the position of Figure 16.

With this arrangement it is evident that the waiting period for discharge and clearance of blocks is employed simultaneously for receiving a charge in the associated mold box. With each movement of the mold box, whether to the right or to the left, there results a discharge of blocks and a charging of the companion or associated mold box. Thus a minimum of time is lost, and the production rate is substantially doubled.

As has been pointed out above, jogging serves two ends, (a) compression or precompression, depending upon whether it acts upon material within the mold box as in Figures 9, 10, and 11, or upon material in the charge box 40 awaiting discharge into the mold box as in Figures 6, 7 and 8, and (b) rapid clearance of the charge in the form of an integrated mass, from the charge box into the mold box, as in Figures 9, 10, and 11. For one of these functions, namely, the rapid discharge into the mold box, the arrangement shown in Figures 26 and 27 may be employed in any or all forms of the machine. In the form illustrated it is particularly designed for use in a machine of the type just described. The partitions 45' within the charge box 46 have an inclined face, and the walls 46' of the charge box are slightly separable under the influence of a double-acting jack cylinder 49, whereupon not only the ends of each charge space, but the sides as well, are more greatly spaced apart, compare Figures 26 and 27. This frees the precompressed charge from restraint, and it drops as an integrated mass into the mold box below.

The arrangement of the machine in Figures 19, 20 and 21 is substantially identical to that of Figures 16, 17 and 18, save that the common die plate, now designated 2b, is elongated sufficiently to permit the employment of two chute openings designated 46a and 46b. The chute itself is wide enough to encompass both openings, with a divider between them. It is believed that no detailed description of this arrangement is necessary, since the operation follows closely after that already given in connection with the description of Figures 12 to 18, inclusive.

The arrangement of Figures 22, 23, and 24 is quite analogous to that of Figures 19, 20 and 21, resembling the latter particularly in that two charge boxes 46a and 46b are employed, but in the form of Figures 22, 23, and 24, instead of effecting discharge at the outside of the table 34, the discharge, whether from the right-hand or from the left-hand die box, is effected at a common central point. In order to accomplish this the common die plate, now designated 2c, is shortened up as much as it was in the form of Figures 16, 17 and 18, and the travel of the several die plates, 1a, 1b and 2c, is such as to move the left-hand mold box from charge-receiving position wherein it registers with the charge box 46a, to the common centrally located discharge point, while at the same time moving the right-hand mold box from the central discharge point into position to register with the right-hand charge box 46b. Upon reversal of the movement the parts move oppositely. Here each set of blocks is at least squeezed to compress it, and while no vibrator or jogger device, nor any expansible charge box, is illustrated in these figures, it is contemplated that some such arrangement will be used.

Incidentally, and advantageously, in this arrangement the common die plates 2c are supported from a common base plate 26c which is located above rather than below them, and the entire assembly slides with relation to the fixed table 34. This affords the further advantage that filler blocks 36 may be supported between the partitions 45, supported upon the table 34, and extending upwardly into the mold spaces to such an extent as may be necessary. In other words, the mold spaces may be made as deep as may be necessary to make the blocks of maximum desired length, and if shorter length blocks are desired, the extra space can be filled in with these stationary filler blocks 36, which then become in effect a part of the table 34. The use of filler blocks for such purposes can also be accomplished in other forms, as, for example, that of Figures 19, 20, and 21.

One problem in the design of such molding machines, whether multiple or singular in design, concerns the control of the movement of the die plate 2a, 2b, or 2c relative to the mold frame 16, of the movement of this mold frame, and the distance between the outside edges of the two chute outlets. Since the common die plate 2a, 2b, or 2c must have some length, and since it must move relative to the mold frame and the die plates 1a and 1b, the spacing between the outside edges of the chute outlets must be the width of the mold box plus the length of the common die plate plus the travel of the common die plate relative to the mold frame, plus any additional travel required to complete enclosure of the mold cavity by passage beyond the outside edge of a chute outlet while it moves between charging and discharging positions. This may produce a rather wide spacing in some designs, as in that of Figures 19, 20, and 21, for example, and a machine which is long overall, and which requires possibly excessive floor space. The arrangement of Figures 16, 17, and 18 shortens the length of the machine, by permitting the bottom to drop away; otherwise, were the die bottom fixed and the die plate movable thereover, the die plate 2a would have to travel, with the mold frame 16, beyond the end of such horizontally fixed die bottom, increasing appreciably the length of travel at each end.

I claim as my invention:

1. A machine for molding concrete blocks or the like, comprising a mold frame, two die plates mounted therein, one at each end, facing one another, a separate die plate interposed within said mold frame, common to and intermediate said die plates, said separate die plate being double-ended, spaced from, and cooperating with each of said mold-frame-mounted die plates to define therewith two distinct and mutually variably-sized mold boxes, means to effect limited relative movement between said common die plate and the mold-frame-mounted die plates, to contract a charged mold box while expanding the other for discharge, and vice versa, fixedly positioned means for the supply of concrete mixture to the respective mold boxes, and means to shift the mold frame to place each mold box alternatively in communication with said supply means.

2. A molding machine as in claim 1, characterized in that the mixture-supplying means comprises two apertures spaced apart enough more than the spacing between the mold boxes that by the time one mold box arrives in charging position relative to its aperture, the second mold box has passed from communication with its aperture, and has reached a medially-disposed discharge point.

3. A molding machine as in claim 1, characterized in that the mixture-supplying means comprises a single aperture centrally disposed between two discharge points, the two discharge points being so spaced, relative to the spacing between the mold boxes, that as either mold box arrives in charging position, the other arrives in discharging position.

4. A machine for molding concrete blocks or the like, comprising a mold frame, two die plates mounted therein, one at each end, facing one another, a separate die plate interposed within said mold frame, common to and intermediate said die plates, said separate die plate being double-ended, spaced from, and cooperating with each of said mold-frame-mounted die plates to define therewith two distinct and mutually variably-sized mold boxes, means to effect limited movement of said common die plate relative to the mold-frame-mounted die plates, to contract a charged mold box while expanding the other for discharge, and vice versa, fixedly positioned means for the supply of concrete mixture to the respective mold boxes, means to shift the mold frame to place each mold box alternatively in communication with said supply means, and means operable automatically in accordance with such shifting of the mold frame to close the bottom of the mold box to be charged, and to open the bottom of the mold box to be discharged.

ROBERT D. WELLS.

REFERENCES CITED

The following references are of record in the file of this patent:

UNITED STATES PATENTS

| Number | Name | Date |
|---|---|---|
| 104,268 | Chapman | June 14, 1870 |
| 804,065 | Steven | Nov. 7, 1905 |
| 829,012 | Jaques | Aug. 21, 1906 |
| 1,426,761 | Norton | Aug. 22, 1922 |
| 1,867,144 | Gelbman | July 12, 1932 |
| 1,967,608 | Clingan et al. | July 24, 1934 |
| 2,275,398 | Koppers | Mar. 3, 1942 |
| 2,471,563 | Gates | May 31, 1949 |

FOREIGN PATENTS

| Number | Country | Date |
|---|---|---|
| 156,093 | Great Britain | May 22, 1922 |
| 366,771 | Germany | Jan. 11, 1923 |